US009022898B2

(12) United States Patent
Park et al.

(10) Patent No.: US 9,022,898 B2
(45) Date of Patent: May 5, 2015

(54) SYSTEM FOR DETERMINING THAT DRIVING OF A HYBRID VEHICLE IS DISABLED

(75) Inventors: Daero Park, Seoul (KR); Seok Min Jeong, Hwasung (KR)

(73) Assignee: Hyundai Motor Company, Seoul (KR)

(*) Notice: Subject to any disclaimer, the term of this patent is extended or adjusted under 35 U.S.C. 154(b) by 654 days.

(21) Appl. No.: 13/312,769

(22) Filed: Dec. 6, 2011

(65) Prior Publication Data

US 2012/0302396 A1 Nov. 29, 2012

(30) Foreign Application Priority Data

May 24, 2011 (KR) ........................ 10-2011-0049155

(51) Int. Cl.
*H02P 15/02* (2006.01)
*B60K 6/442* (2007.10)
*B60W 50/02* (2012.01)
*B60K 6/547* (2007.10)
*B60W 10/11* (2012.01)
*B60W 20/00* (2006.01)

(52) U.S. Cl.
CPC ............. *B60K 6/442* (2013.01); *Y02T 10/6234* (2013.01); *B60W 50/0205* (2013.01); *B60K 6/547* (2013.01); *B60W 10/11* (2013.01); *B60W 20/50* (2013.01); *Y10S 477/906* (2013.01)

(58) Field of Classification Search
USPC ................................................ 477/5, 12, 906
See application file for complete search history.

(56) References Cited

U.S. PATENT DOCUMENTS 5,343,970 A * 9/1994 Severinsky ........................ 475/5

FOREIGN PATENT DOCUMENTS

| JP | 10-126901 A | 5/1998 |
|---|---|---|
| JP | 2000-097337 A | 4/2000 |
| JP | 2006-152868 A | 6/2006 |
| JP | 2009-060695 A | 3/2009 |
| KR | 10-0897097 B1 | 5/2009 |

OTHER PUBLICATIONS

Translation of JP-2009-060695-A.*

* cited by examiner

*Primary Examiner* — Derek D Knight
(74) *Attorney, Agent, or Firm* — Mintz Levin Cohn Ferris Glovsky and Popeo, P.C.; Peter F. Corless

(57) ABSTRACT

A system for determining disablement of driving of a hybrid vehicle is disclosed. The system for determining disablement of driving of a hybrid vehicle may include: power electronic components having a battery at which DC electricity is stored, an inverter converting the DC electricity of the battery into AC electricity, and a motor receiving the AC electricity from the inverter and generating driving torque; an engine burning a fuel so as to generate driving torque and being selectively connected to the motor; an engine clutch selectively connecting the engine to the motor; a transmission connected to the motor to receive the driving torque of the motor or the driving torque of the engine; and a control portion controlling operations of the power electronic components, the engine, and the engine clutch, wherein the control portion turns off a system ready indication in a case that driving of the vehicle is disabled.

15 Claims, 3 Drawing Sheets

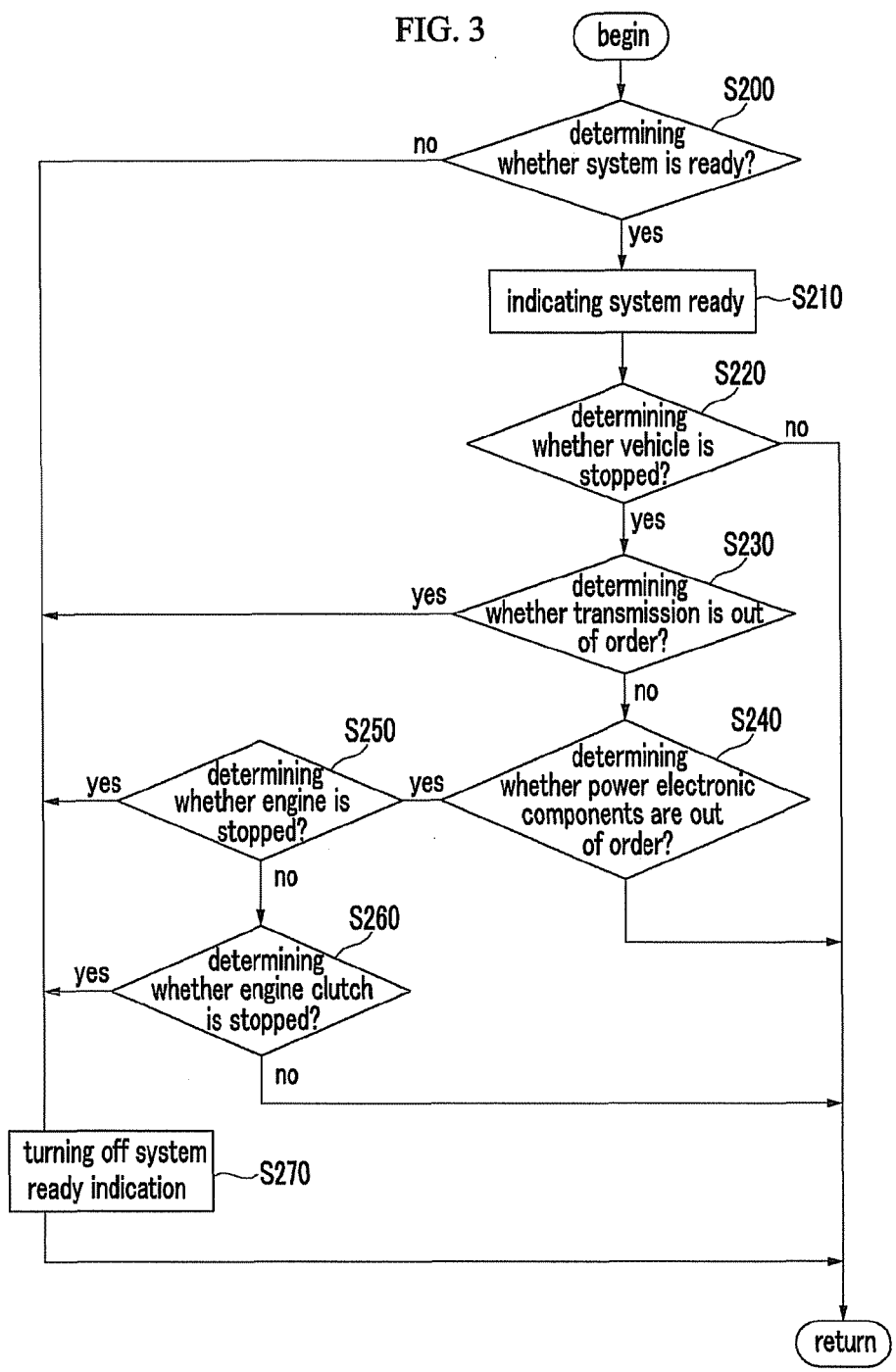

SYSTEM FOR DETERMINING THAT DRIVING OF A HYBRID VEHICLE IS DISABLED

CROSS-REFERENCE TO RELATED APPLICATION

This application claims priority to and the benefit of Korean Patent Application No. 10-2011-0049155 filed in the Korean Intellectual Property Office on May 24, 2011, the entire contents of which are incorporated herein by reference.

BACKGROUND OF THE INVENTION (a) Field of the Invention

The present invention relates to a hybrid vehicle. More particularly, the present invention relates to a system for determining whether driving of a hybrid vehicle is disabled ("disablement" of the vehicle).

(b) Description of the Related Art

According to a need for enhancement of vehicle fuel consumption, and the strengthening of an exhaust gas regulation in each country, there is increased demand for an environmentally-friendly vehicle, and thus a hybrid vehicle receives much attention. The typical hybrid vehicle includes an engine, a transmission, a electrically driven motor, an inverter, and a battery. In particular, the engine, the transmission, the motor, the inverter, and the battery are adapted to generate target driving torque by control of a control portion.

In a case of a gasoline or a diesel vehicle, a driver can perceive whether the engine is started by the "running" (internal combustion) of the engine. Since the hybrid vehicle, however, can be driven by only the motor, the engine may not be operated/running after starting. Therefore, the hybrid vehicle should inform the driver of "enablement" of vehicle's driving, e.g., the ability to drive the vehicle. Typically, the hybrid vehicle informs the driver of the enablement of vehicle's driving by turning on a 'system ready' lamp installed at an instrument. Thus, a 'system ready' means a state at which the vehicle can run in this specification.

However, there are reasons why a vehicle may not run during a normal operation after the system ready lamp is turned on. For example, if a transmission is out-of-order, the vehicle cannot run. In this case, "disablement" of vehicle's driving should be informed to the driver, i.e., the inability to drive the vehicle.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system for determining disablement of driving of a hybrid vehicle. In particular, the invention has the advantages of informing a driver of disablement of vehicle's driving such that the driver can address/correct the disablement state.

A system for determining disablement of driving of a hybrid vehicle according to an exemplary embodiment of the present invention may include: power electronic components having a battery at which DC electricity is stored, an inverter converting the DC electricity of the battery into AC electricity, and a motor receiving the AC electricity from the inverter and generating driving torque; an engine burning a fuel so as to generate driving torque and being selectively connected to the motor; an engine clutch selectively connecting the engine to the motor; a transmission connected to the motor to receive the driving torque of the motor or the driving torque of the engine; and a control portion controlling operations of the power electronic components, the engine, and the engine clutch, wherein the control portion turns off a system ready indication in a case that driving of the vehicle is disabled.

For example, the control portion may turn off a system ready indication in a case that driving of the vehicle is disabled the transmission is determined to be out-of-order in a state that a system ready is indicated and a vehicle is stopped.

In addition, the control portion may turn off the system ready indication in a case that the power electronic components is out-of-order and the engine is stopped in a state that the transmission is not out-of-order.

Alternatively, the control portion may turn off the system ready indication in a case that the engine clutch is out-of-order in a state that the power electronic components are out-of-order and the engine is operated.

The control portion may also maintain the system ready indication in a case that the transmission is not out-of-order and the power electronic components are not out-of-order.

The control portion may maintain the system ready indication in a case that the transmission is not out-of-order, the power electronic components are out-of-order, the engine is operated, and the engine clutch is not out-of-order.

A system for determining disablement of driving of a hybrid vehicle according to another exemplary embodiment of the present invention may include: power electronic components having a battery at which DC electricity is stored, an inverter converting the DC electricity of the battery into AC electricity, and a motor receiving the AC electricity from the inverter and generating driving torque; an engine burning a fuel so as to generate driving torque and being selectively connected to the motor; an engine clutch selectively connecting the engine to the motor; a transmission connected to the motor to receive the driving torque of the motor or the driving torque of the engine; a differential apparatus receiving the driving torque of the motor or the driving torque of the engine from the transmission and driving a wheel; and a control portion controlling operations of the power electronic components, the engine, and the engine clutch, wherein the control portion turns off a system ready indication in a case that the driving torque of the motor or the driving torque of the engine is not normally transmitted to the differential apparatus in a state that a system ready is indicated and the vehicle is stopped.

The driving torque of the motor or the driving torque of the engine may not be transmitted to the differential apparatus when the transmission is out-of-order, the power electronic components are out-of-order and the engine is stopped, or the power electronic components are out-of-order, the engine is operated, and the engine clutch is out-of-order.

BRIEF DESCRIPTION OF THE DRAWINGS

FIG. 3 is a flowchart of a method for determining disablement of driving of a hybrid vehicle according to an exemplary embodiment of the present invention.

DETAILED DESCRIPTION OF THE EMBODIMENTS

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
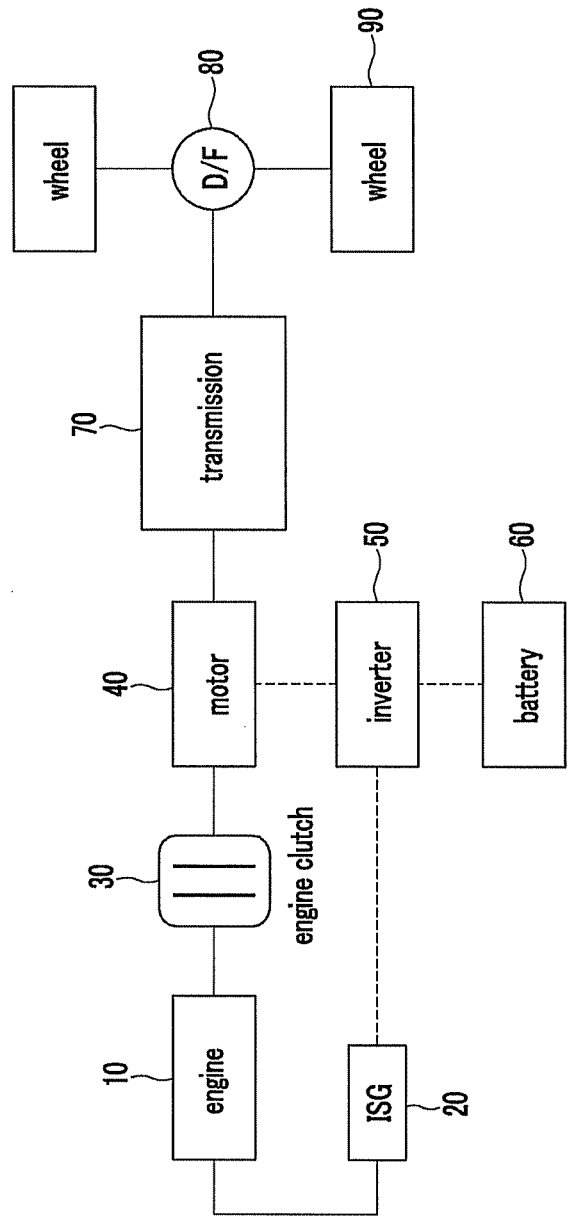
FIG. 1 is a schematic diagram of a hybrid vehicle according to an exemplary embodiment of the present invention.

FIG. 1 is a schematic diagram of a hybrid vehicle according to an exemplary embodiment of the present invention.

As shown in FIG. 1, a hybrid vehicle according to an exemplary embodiment of the present invention includes an engine 10, power electronic components 40, 50, and 60, an integrated starter and generator (ISG) 20, an engine clutch 30, a transmission 70, and a differential apparatus 80.

The engine 10 generates driving torque by burning fuel. A gasoline engine, a diesel engine, a liquefied petroleum gas (LPG) engine, a methanol engine, or a hydrogen engine can be used.

The power electronic components 40, 50, and 60 may specifically include an electric drive motor 40, an inverter 50, and a battery 60.

The motor 40 receives electricity from the battery 60 and generates driving torque. The motor 40 is selectively connected to the engine 10 through the engine clutch 30 so as to receive the driving torque generated at the engine 10. In addition, the motor 40 is connected to the transmission 70 so as to transmit the driving torque of the engine 10 and/or the driving torque of the motor 40 to the transmission 70.

The inverter 50 converts DC electricity of the battery 60 into AC electricity and applies the AC electricity to the motor 40. In addition, the inverter converts AC electricity generated by rotation of the motor 40 or the ISO 20 into DC electricity and applies the DC electricity to the battery 60 in some case. Thereby, the battery 60 is charged.

The DC electricity is stored at the battery 60. The battery 60 supplies the DC electricity to the inverter 50 or receives the DC electricity from the inverter 50.

The ISG 20 is connected to the engine 10 and starts the hybrid vehicle or drives it at a low engine speed.

The engine clutch 30 is disposed between the engine 10 and the motor 40, and connects the engine 10 to the motor 40 selectively. That is, if the engine clutch 30 operates, the engine 10 is connected to the motor 40 and the driving torque of the engine 10 is transmitted to the motor 40. If the engine clutch 30, on the contrary, does not operate, the engine 10 is not connected to the motor 40.

The transmission 70 is connected to the motor 40 and receives the driving torque of the engine 10 and/or the driving torque of the motor 40. The transmission 70 changes strength of the driving torque received from the engine 10 and/or the motor 40 (by changing rotation speed according to engaged gear ratio).

The differential apparatus 80 delivers the driving torque received from the transmission 70 to a wheel 90 so as to run the hybrid vehicle.

Figure 2:
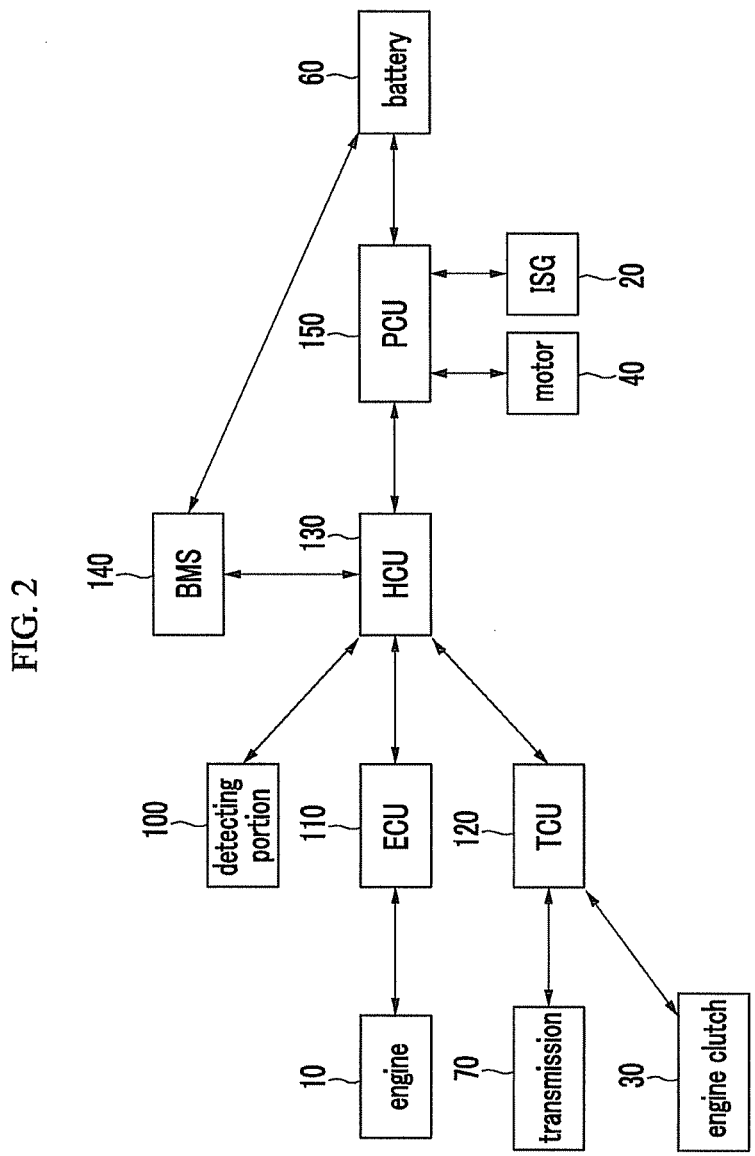
FIG. 2 is a block diagram of a system for determining disablement of driving of a hybrid vehicle according to an exemplary embodiment of the present invention.

FIG. 2 is a block diagram of a system for determining disablement of driving of a hybrid vehicle according to an exemplary embodiment of the present invention.

As shown in FIG. 2, a system for determining disablement of driving of a hybrid vehicle according to an exemplary embodiment of the present invention includes a detecting portion 100, an engine control unit (ECU) 110, a transmission control unit (TCU) 120, a hybrid control unit (HCU) 130, a battery management system (BMS) 140, and a power control unit (PCU) 150.

The detecting portion 110 detects information on such as a displacement of an accelerator pedal, a displacement of a brake pedal, a vehicle speed, an engine speed, a state of charge (SOC) of the battery 60, and a currently-engaged shift speed, and transmits the information to the HCU 130.

The ECU 110 controls operation of the engine 10 together with the HCU 130 connected through a network.

The TCU 120 controls actuators provided at the transmission 70 by a control of the HCU 130 connected through the network so as to control a shift to a target shift speed, controls pressure of fluid supplied to the engine clutch 30 so as to perform an engagement or a release of the engine clutch 30, and controls delivery of the driving toque of the engine 10.

The HCU 130 is an uppermost controller, and controls subordinate controllers connected through the network so as to control overall operation of the hybrid vehicle.

The BMS 140 detects information on voltage, current, and temperature of the battery 60 so as to manage charging state of the battery 60, and controls charging current or discharging current of the battery 60 such that the battery is not overdischarged below a limit voltage or overcharged above a limit voltage.

The PCU 150 includes a motor control unit (MCU), an inverter 60 having a plurality of electricity switching elements, and a protection circuit, and converts the DC electricity supplied from the battery 60 into the AC electricity according to a control signal applied from the HCU 104 so as to control driving of the motor 40.

In addition, the PCU 150 charges the battery 60 by using electricity generated at the motor 40.

At least one of an insulated gate bipolar transistor (IGBT), a MOSFET, a transistor, and a relay is used as the electricity switching elements included in the PCU 150.

In this specification, the ECU 110, the TCU 120, the HCU 130, the BMS 140, and the PCU 150 are called a "control portion".

FIG. 3 is a flowchart of a method for determining disablement of driving of a hybrid vehicle according to an exemplary embodiment of the present invention. Note that while an illustrative order of steps are shown, other suitable orders may be used, and the order shown is merely an example.

As shown in FIG. 3, when a method for determining a disablement of driving of a hybrid vehicle according to an exemplary embodiment of the present invention is begun, the control portion determines whether a system is in a "ready state" at a step S200. As described above, the system ready state means a state at which the hybrid vehicle can drive, that is, a starting has successfully completed, and the transmission 70, the engine clutch 30, and the power electronic components 40, 50, and 60 are not out-of-order.

If the system is not in the ready state at the step S200, the control portion turns off a system ready lamp or maintains turn-off state of the system ready lamp in step S270.

If the system is in a ready state at the step S200, the control portion turns on the system ready lamp at a step S210. At this state, a driver can drive the hybrid vehicle freely.

In a state that the driver drives the hybrid vehicle, the control portion determines whether the vehicle is stopped at a step S220.

If the vehicle is not stopped at the step S220, the control portion returns to a beginning step.

If the vehicle is stopped at the step S220, the control portion determines whether the transmission 70 is out-of-order at a step S230. The transmission 70 is determined to be out-of-order when a shift lever is out-of-order or a gear ratio at any shift speed detected by the detecting portion 100 is different from a gear ratio calculated from an input and an output of the transmission 70.

If the transmission 70 is out-of-order at the step S230, the control portion turns off the system ready lamp at a step S270 and returns to the beginning step because the driving torque of the motor 40 or the engine 10 is not normally transmitted to the differential apparatus 80.

If the transmission 70 is not out-of-order at the step S230, the control portion determines whether the power electronic components 40, 50, and 60 are out-of-order at a step S240. The power electronic components 40, 50, and 60 are determined to be out-of-order when overvoltage of a battery cell, undervoltage of the battery cell, excess temperature of the battery, dielectric breakdown (insulation resistance is lower than a predetermined resistance), breakdown of a relay module, short or disconnection of a motor cable, short or disconnection of the IGBT, breakage of a power module, breakage of a current sensor, breakage of a motor position sensor, abnormality of a resolver signal, excess temperature of the inverter, excess temperature of the motor, or overcurrent of the motor occurs.

If the power electronic components 40, 50, and 60 are not out-of-order at the step S240, the control portion returns to the beginning step.

If the power electronic components 40, 50, and 60 are out-of-order at the step S240, the control portion determines whether the engine 10 is stopped at a step S250.

If the engine 10 is stopped at the step S250, the control portion turns off the system ready lamp at the step S270 and returns to the beginning step because the engine 10 cannot be started due to breakage of the power electronic components 40, 50, and 60.

If the engine 10 is operated at the step S250, the control portion determines whether the engine clutch 30 is out-of-order at a step S260.

If the engine clutch 30 is out-of-order at the step S260, the control portion turns off the system ready lamp at the step S270 and returns to the beginning step because the driving torque of the engine 10 cannot be transmitted to the transmission 70.

If the engine clutch 30 is not out-of-order at the step S260, the control portion returns to the beginning step because the vehicle can drive by the driving torque of the engine 10.

It is exemplified in this specification that the system ready is indicated by turning on the system ready lamp, but is not limited to this. That is, any means for indicating the system ready state can be used.

As described above, a disablement of driving of a vehicle is indicated to a driver such that the driver can respond to the disablement state according to an exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for determining disablement of driving of a hybrid vehicle, comprising:
    power electronic components having a battery at which DC electricity is stored, an inverter to convert the DC electricity of the battery into AC electricity, and a motor to receive the AC electricity from the inverter and to generate driving torque;
    an engine to burn a fuel so as to generate driving torque, and the engine selectively connected to the motor;
    an engine clutch to selectively connect the engine to the motor;
    a transmission connected to the motor to receive at least one of either the driving torque of the motor or the driving torque of the engine; and
    a control portion to control operations of the power electronic components, the engine, and the engine clutch,
    wherein the control portion is configured to turn off a system ready indication in response to driving of the vehicle being disabled.

2. The system of claim 1, wherein driving of the vehicle being disabled is determined in response to the transmission malfunctioning in a state that a system ready is indicated and the vehicle is stopped.

3. The system of claim 1, wherein driving of the vehicle being disabled is determined in response to the power electronic components malfunctioning and the engine being stopped.

4. The system of claim 1, wherein driving of the vehicle being disabled is determined in response to the engine clutch malfunctioning in a state that the power electronic components have malfunctioned and the engine is operated.

5. The system of claim 1, wherein the control portion maintains the system ready indication in a case that the transmission has not malfunctioned and the power electronic components have not of malfunctioned.

6. The system of claim 1, wherein the control portion maintains the system ready indication in a case that the transmission has not malfunctioned, the power electronic components have malfunctioned, the engine is operated, and the engine clutch has not malfunctioned.

7. A system for determining disablement of driving of a hybrid vehicle, comprising:
    power electronic components having a battery at which DC electricity is stored, an inverter to convert the DC electricity of the battery into AC electricity, and a motor to receive the AC electricity from the inverter and to generate driving torque;
    an engine to burn a fuel so as to generate driving torque, the engine selectively connected to the motor;
    an engine clutch to selectively connect the engine to the motor;
    a transmission connected to the motor to receive at least one of either the driving torque of the motor or the driving torque of the engine;
    a differential apparatus to receive the at least one of either the driving torque of the motor or the driving torque of the engine from the transmission, the differential apparatus to drive a wheel; and
    a control portion to control operations of the power electronic components, the engine, and the engine clutch,
    wherein the control portion turns off a system ready indication in a case that neither the driving torque of the motor nor the driving torque of the engine is normally transmitted to the differential apparatus in a state that a system ready is indicated and a vehicle is stopped.

8. The system of claim 7, wherein neither the driving torque of the motor nor the driving torque of the engine is transmitted to the differential apparatus when the transmission has malfunctioned, the power electronic components have malfunctioned and the engine is stopped, or the power electronic components have malfunctioned, the engine is operated, and the engine clutch has malfunctioned.

9. A method for determining disablement of driving of a hybrid vehicle, comprising:
controlling operations of power electronic components having a battery at which DC electricity is stored, an inverter to convert the DC electricity of the battery into AC electricity, and a motor to receive the AC electricity from the inverter and to generate driving torque;
controlling operations of an engine configured to burn a fuel so as to generate driving torque, the engine being selectively connected to the motor;
controlling operating of an engine clutch that selectively connects the engine to the motor;
determining whether driving of the vehicle is disabled; and
turning off a system ready indication in response to driving of the vehicle being disabled.

10. The method of claim 9, wherein determining that driving of the vehicle is disabled comprises:
determining that a transmission has malfunctioned in a state that a system ready is indicated and a vehicle is stopped, the transmission connected to the motor and configured to receive at least one of either the driving torque of the motor or the driving torque of the engine.

11. The method of claim 9, wherein determining that driving of the vehicle is disabled comprises:
determining that the power electronic components have malfunctioned and the engine is stopped.

12. The method of claim 9, wherein determining that driving of the vehicle is disabled comprises:
determining that the engine clutch has malfunctioned in a state that the power electronic components have malfunctioned and the engine is operated.

13. The method of claim 9, further comprising:
maintaining the system ready indication in response to driving of the vehicle not being disabled.

14. The method of claim 13, wherein determining that driving of the vehicle is not disabled comprises:
determining that a transmission has not malfunctioned and the power electronic components have not malfunctioned, the transmission connected to the motor and configured to receive at least one of either the driving torque of the motor or the driving torque of the engine.

15. The method of claim 13, wherein determining that driving of the vehicle is not disabled comprises:
determining that a transmission has not malfunctioned, the power electronic components have malfunctioned, the engine is operated, and the engine clutch has not malfunctioned, the transmission connected to the motor and configured to receive at least one of either the driving torque of the motor or the driving torque of the engine.

* * * * *